US011964408B2

(12) United States Patent
Van Doren

(10) Patent No.: US 11,964,408 B2
(45) Date of Patent: Apr. 23, 2024

(54) REUSABLE UNIVERSAL WAFFLE-CAVITY MOLDING FORM

(71) Applicant: David Van Doren, Hays, KS (US)

(72) Inventor: David Van Doren, Hays, KS (US)

(*) Notice: Subject to any disclaimer, the term of this patent is extended or adjusted under 35 U.S.C. 154(b) by 378 days.

(21) Appl. No.: 17/189,547

(22) Filed: Mar. 2, 2021

(65) Prior Publication Data

US 2021/0268689 A1 Sep. 2, 2021

Related U.S. Application Data

(60) Provisional application No. 62/983,994, filed on Mar. 2, 2020.

(51) Int. Cl.

*E04G 11/08* (2006.01)
*B28B 7/00* (2006.01)
*B28B 7/16* (2006.01)
*E04G 11/36* (2006.01)

(52) U.S. Cl.

CPC ............ *B28B 7/164* (2013.01); *B28B 7/0014* (2013.01); *B28B 7/0064* (2013.01); *E04G 11/085* (2013.01); *E04G 11/365* (2013.01)

(58) Field of Classification Search

CPC ... B28B 7/0014; B28B 7/0017; B28B 7/0064; B28B 7/0082; B28B 2007/005; B28B 2007/0052; B28B 7/164; B28B 7/263; E04G 11/40; E04G 11/365; E04G 9/05; E04G 9/10

See application file for complete search history.

(56) References Cited

U.S. PATENT DOCUMENTS 2,775,019 A * 12/1956 Bemis ..................... E04B 5/268 249/176
3,488,027 A * 1/1970 Evans ..................... E04G 11/46 249/176
3,503,583 A * 3/1970 Emerson ................. E04G 11/46 249/176
3,520,967 A * 7/1970 Kreier, Jr. ............... B28B 7/164 249/115
3,695,574 A 10/1972 Charlier et al.
4,025,021 A * 5/1977 Stout ....................... E04G 11/46 249/189

(Continued)

FOREIGN PATENT DOCUMENTS

CN 107700831 A * 2/2018
CN 109403624 A * 3/2019 ............. E04G 11/40

(Continued)

*Primary Examiner* — Jessica L Laux

(74) *Attorney, Agent, or Firm* — AVEK IP, LLC; Mark C. Young

(57) ABSTRACT

A universally adaptable waffle-cavity form and methods for constructing a waffle panel are described. The waffle-cavity form is provided with a standard shape and size and can be easily adapted to alter the dimensions thereof. The form can be cut down and combined with one or more other cut down forms to provide a combined form with desired dimensions. The forms can also be combined without first being cut down through the use of a saddle that is placed over a joint therebetween. A plurality of the forms can be affixed to a mold decking in a desired arrangement using anchors installed therebetween to form a mold that is reusable to produce multiple waffle panels.

17 Claims, 12 Drawing Sheets

(56) References Cited

U.S. PATENT DOCUMENTS

| | | | | | |
|---|---|---|---|---|---|
| 4,150,808 | A * | 4/1979 | Sawyer | E04G 9/10 249/189 |
| 4,181,286 | A | 1/1980 | Van Doren | |
| 4,659,057 | A * | 4/1987 | Felter | B28B 7/164 249/176 |
| 5,667,192 | A * | 9/1997 | Van Doren | B28B 7/06 249/82 |
| 10,066,404 | B2 | 9/2018 | Parodi | |
| 2001/0003234 | A1 | 6/2001 | Van Doren | |
| 2005/0011152 | A1 | 1/2005 | O'Grady et al. | |
| 2015/0001761 | A1 | 1/2015 | Bratton et al. | |
| 2017/0268242 | A1* | 9/2017 | Molinelli | E04G 11/46 |
| 2021/0316474 | A1* | 10/2021 | Johnson | B28B 23/005 |

FOREIGN PATENT DOCUMENTS

| | | | | | |
|---|---|---|---|---|---|
| CN | 111706073 | A * | 9/2020 | E04C 5/06 |
| CN | 111395620 | B * | 1/2022 | E04B 5/21 |
| DE | 19540495 | A1 * | 6/1997 | E04G 9/10 |
| EP | 1236843 | A2 * | 9/2002 | E04B 5/21 |
| ES | 2321264 | A1 * | 6/2009 | E04G 11/46 |
| GB | 1192928 | A * | 5/1970 | E04G 11/46 |
| IL | 59951 | A * | 7/1982 | B28B 7/00 |
| JP | 11324317 | A | 11/1999 | |
| KR | 20140010265 | A | 1/2014 | |
| KR | 101388248 | B1 | 4/2014 | |
| KR | 101489140 | B1 | 2/2015 | |
| KR | 2020046261 | A * | 5/2020 | E04G 11/40 |
| RU | 2601883 | C1 * | 11/2016 | E04G 9/00 |
| WO | WO-0248479 | A2 * | 6/2002 | E04G 11/40 |
| WO | WO-03048471 | A1 * | 6/2003 | E04B 5/326 |
| WO | WO-2005108701 | A1 * | 11/2005 | B28B 19/0046 |
| WO | 2009064157 | A2 | 5/2009 | |
| WO | WO-2009064157 | A2 * | 5/2009 | E04G 11/46 |
| WO | WO-2009067723 | A2 * | 5/2009 | B28B 7/164 |
| WO | WO-2015004188 | A1 * | 1/2015 | E04G 11/08 |
| WO | 2018135802 | A1 | 7/2018 | |
| WO | WO-2018122721 | A1 * | 7/2018 | E04B 1/166 |

* cited by examiner

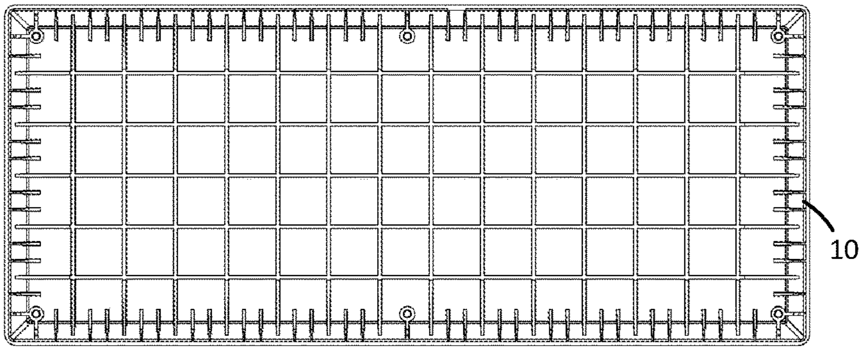
Fig. 16
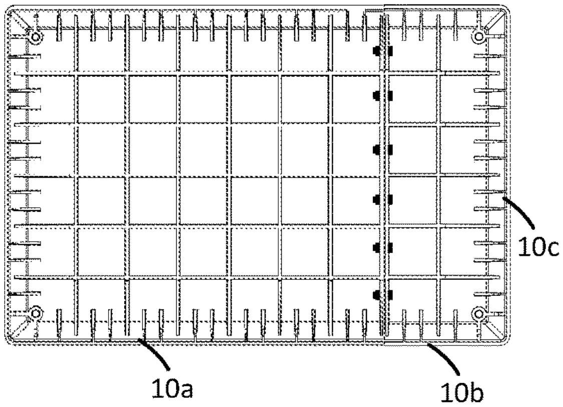
Fig. 17
Fig. 18
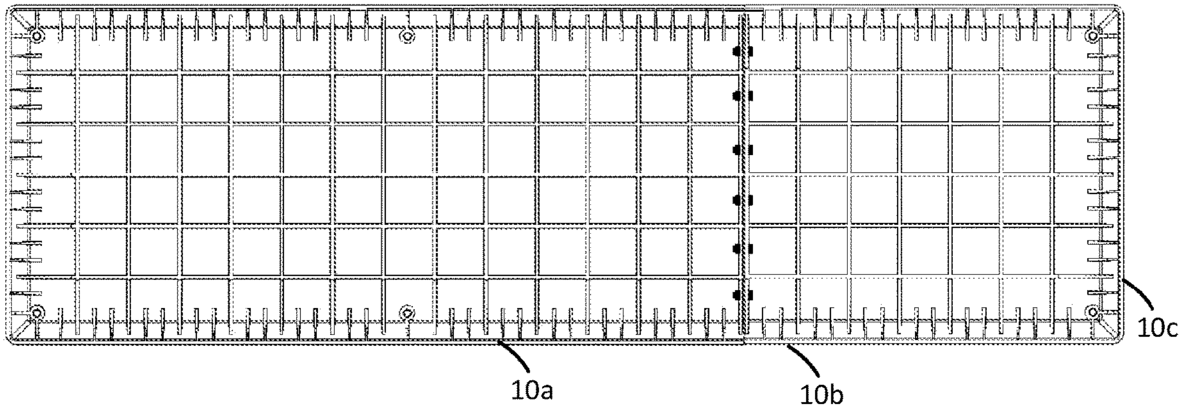
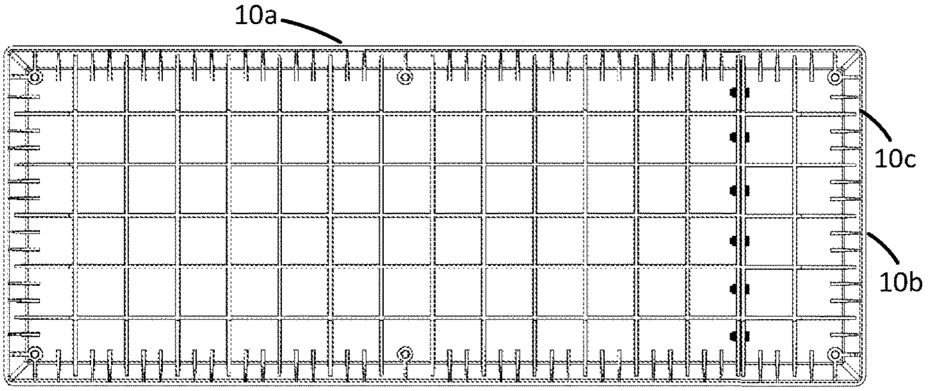
Fig. 19

REUSABLE UNIVERSAL WAFFLE-CAVITY MOLDING FORM

CROSS-REFERENCE TO RELATED APPLICATIONS

This application claims the benefit of U.S. Provisional Patent Application No. 62/983,994, filed Mar. 2, 2020, the disclosure of which is hereby incorporated herein in its entirety by reference.

BACKGROUND

Construction of structures using cast concrete wall, floor, and ceiling panels is well known. To reduce the volume of concrete required for such panels and the weight thereof they may be provided with a "waffle" form having a series of generally evenly spaced and sized voids, indentations, or openings. Known production methods for these waffle panels employ a frame within which a plurality of prefabricated waffle-cavity forms are disposed in a spaced-apart, uniform, grid-like arrangement.

Many drawbacks are present in available waffle-cavity forms useable for production of waffle panels. For example, the forms are typically disposable or degradable in nature such that they may be employed only a single time to form a single waffle panel. The forms are then removed from the molded panel and discarded. The forms may alternatively be left in place to remain as a part of the completed waffle panel. In either instance, new forms must be employed in production of subsequent waffle panels. Additionally, the forms are provided in a single or limited number of sizes or dimensions and are not easily adaptable to different dimensions. As such, available layouts of the forms within a waffle panel are limited and are not easily altered or adapted during production of the waffle panels. Inadaptability also requires waffle-cavity forms of multiple sizes and dimension to be maintained in inventory in order to accommodate production of a variety of waffle panel configurations.

SUMMARY

A high-level overview of various aspects of exemplary embodiments is provided here to introduce a selection of concepts that are further described in the Detailed-Description section below. This summary is not intended to identify key features or essential features of embodiments, nor is it intended to be used in isolation to determine the scope of the described subject matter. In brief, this disclosure describes a waffle-cavity molding form that is easily adaptable to desired dimensions and that is highly reusable. This disclosure also describes waffle panels constructed using the waffle-cavity molding forms and methods for producing such waffle panels.

The waffle-cavity molding form comprises a single unitary component having a planar top wall with a downwardly depending perimeter wall that is preferably shaped as a trapezoidal prism although other forms may be employed. An underside of the form is hollow and contains a plurality of longitudinal and transverse ribs extending along the length and width of the form, respectively. The ribs are positioned and formed to enable at least partial nesting of the forms when stacked vertically. Select ones of the ribs are modified to form anchor stanchions at various locations about the perimeter of the form. The stanchions include a bore extending therethrough and open through the top wall of the form to allow installation of a fastener or anchor through the thickness of the form and into an underlying decking of a waffle panel mold. The ribs also form pockets along the underside of the top wall which may act to at least partially insulate the form to aid curing of concrete poured thereon.

The waffle-cavity forms are easily adaptable to produce waffle cavities of varied dimensions. In one embodiment, two or more forms can be cut transversely or longitudinally along or between their respective ribs such that, when abutted along their cut edges, they provide a combined form having desired dimensions. The cut forms can be joined by installing fasteners between their respective ribs adjacent to their cut edges. In another embodiment, cut and/or uncut forms may be placed end-to-end or side-by-side and a saddle disposed over a junction therebetween to form a unitary structure of desired dimensions.

DESCRIPTION OF THE DRAWINGS

Illustrative embodiments are described in detail below with reference to the attached drawing figures, and wherein:

FIG. 16 is a bottom plan view of a full-size waffle panel form depicted in accordance with an exemplary embodiment;

FIG. 17 is a bottom plan view of a shortened waffle panel form produced from a pair of cut-down waffle panel forms depicted in accordance with an exemplary embodiment;

FIGS. 18 and 19 are bottom plan views of lengthened waffle panel form produced from a pair of cut-down waffle panel forms depicted in accordance with an exemplary embodiment;

DETAILED DESCRIPTION

The subject matter of select exemplary embodiments is described with specificity herein to meet statutory requirements. But the description itself is not intended to necessarily limit the scope of embodiments. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Figure 1:
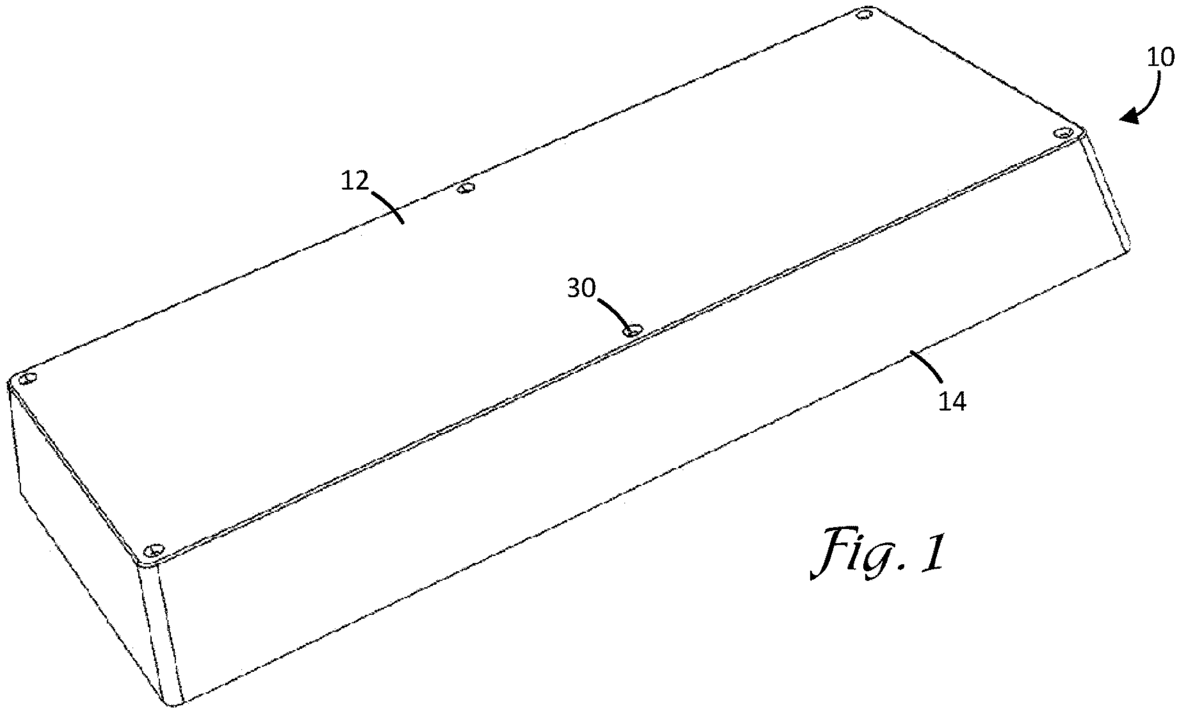
FIG. 1 is a perspective top view of a waffle panel form depicted in accordance with an exemplary embodiment.
Figure 2:
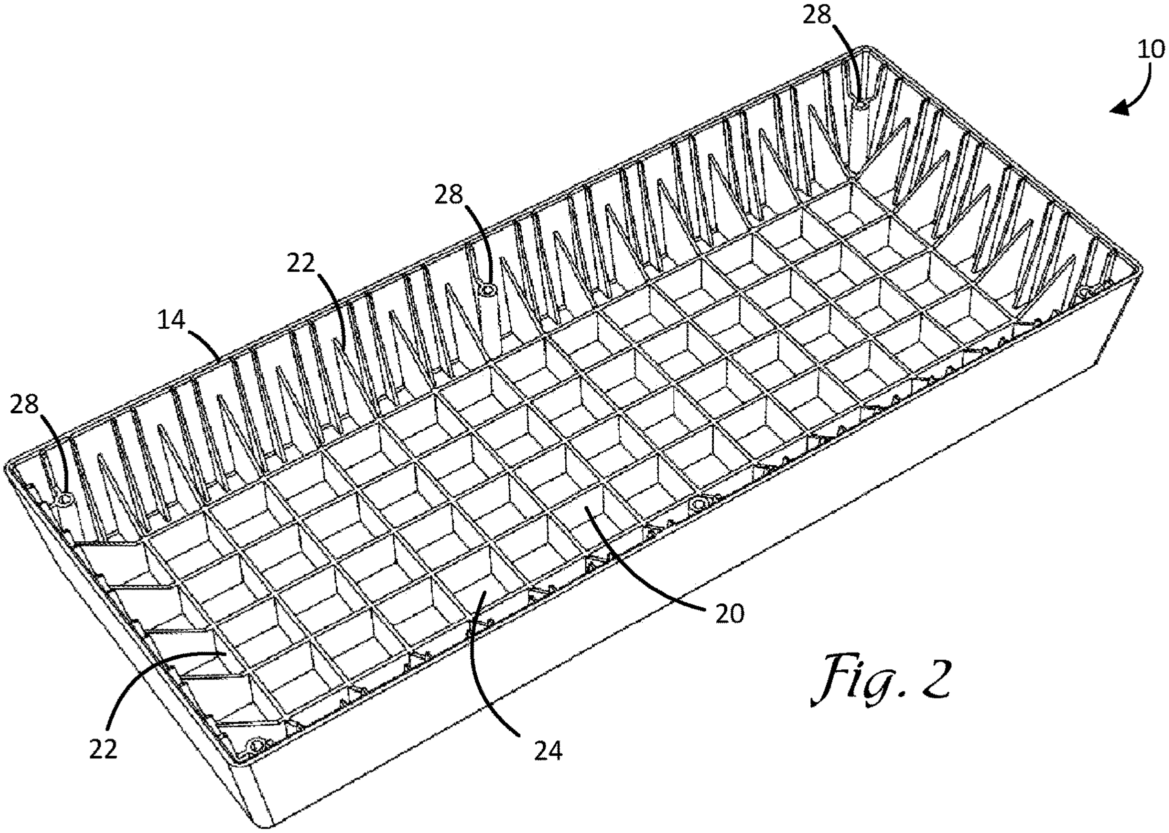
FIG. 2 is a perspective bottom view of the waffle panel form of FIG. 1.

With initial reference to FIGS. 1 and 2, a universal waffle-cavity molding form 10 is described in accordance with an exemplary embodiment. The form 10 comprises a planar top wall 12 with a downwardly depending perimeter wall 14. The perimeter wall 14 is positioned on a slight outward angle relative to the top wall 12 and provides the form 10 with a generally trapezoidal prismatic form. The angle of the perimeter wall 14 is preferably about 0°-20° or about 5°-15° or about 9°-10° and is configured to provide sufficient draft to aid demolding of a waffle panel 16 formed in a mold 18 that employs a plurality of the forms 10 (see additionally FIGS. 21-24). However, other draft angles and three-dimensional forms of the form 10 may be employed without departing from the scope of embodiments described herein.

As depicted in FIG. 2, an underside of the form 10 is generally hollow and includes a plurality of longitudinal ribs 20 extending along a length of the form 10 and a plurality of transverse ribs 22 extending along a width of the form 10. Each of the longitudinal ribs 20 extends at a first end of the form 10 from the perimeter wall 14 at an angle toward the top wall 12 and to a first intersection with the respective transverse rib 22 at which point the longitudinal rib 20 maintains a height relative to the top wall 12 along the length of the form 10 until reaching a last intersection with the respective transverse rib 22. At this intersection the longitudinal rib 20 extends away from the top wall 12 and to a junction with an opposite portion of the perimeter wall 14 at the second end of the form 10 generally mirroring the configuration at the first end of the form 10. The transverse ribs 22 are provided with a similar configuration but extending transversely across the width of the form 10 and intersecting the longitudinal ribs 20. As such, the longitudinal and transverse ribs 20, 22 form a grid of pockets 24 along an underside of the top wall 12 and distal edges of the ribs 20, 22 provide a generally planar grid surface that is inset into the underside of the form 10. A plurality of stiffening ridges 26 may also be provided along the perimeter wall 14 between adjacent ones of the ribs 20, 22 to provide additional stiffness or rigidity to the perimeter wall 14.

Figure 4:
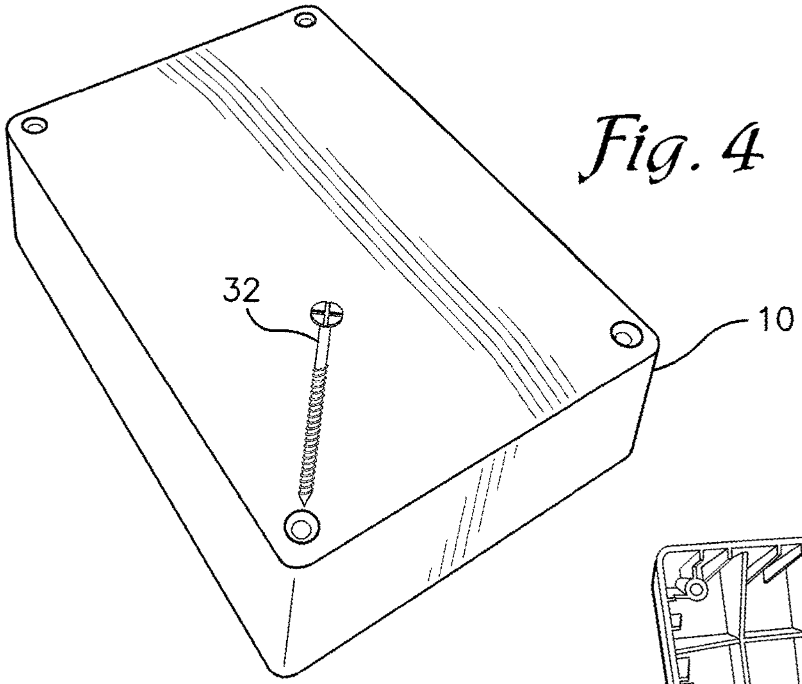
FIG. 4 is an illustrative image of a waffle panel form and an anchor useable to couple the waffle panel form to a panel body depicted in accordance with an exemplary embodiment.
Figure 5:
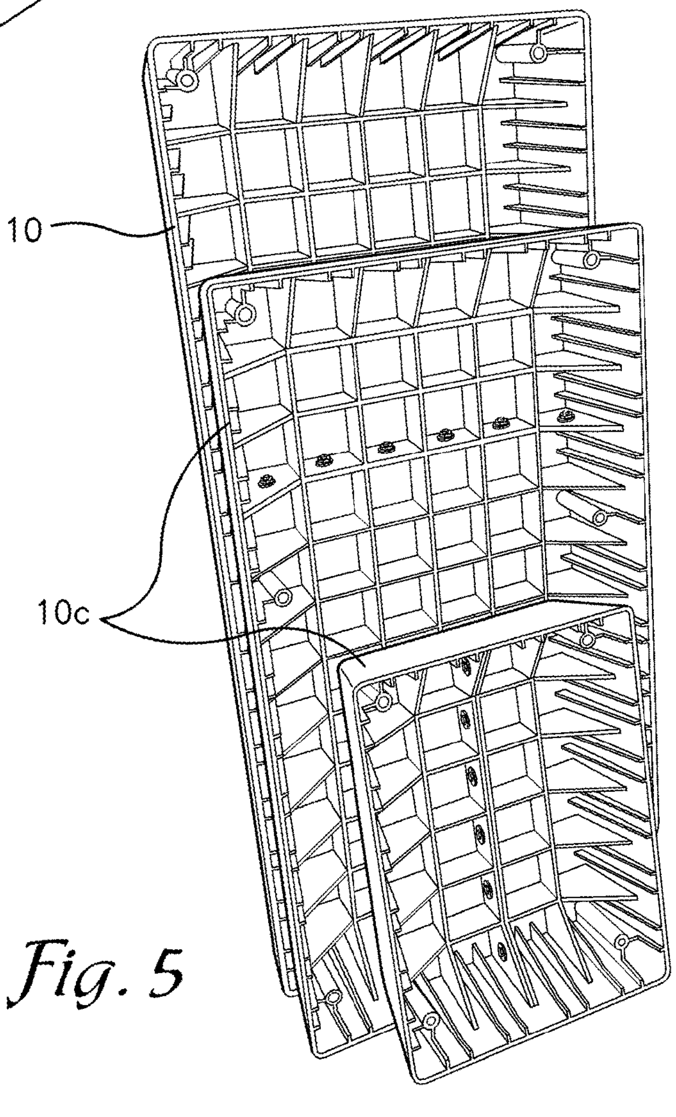
FIG. 5 is an illustrative image a plurality of waffle panel forms having various dimensions, each having been constructed from the waffle panel form of FIG. 1 in accordance with an exemplary embodiment.
Figure 6:
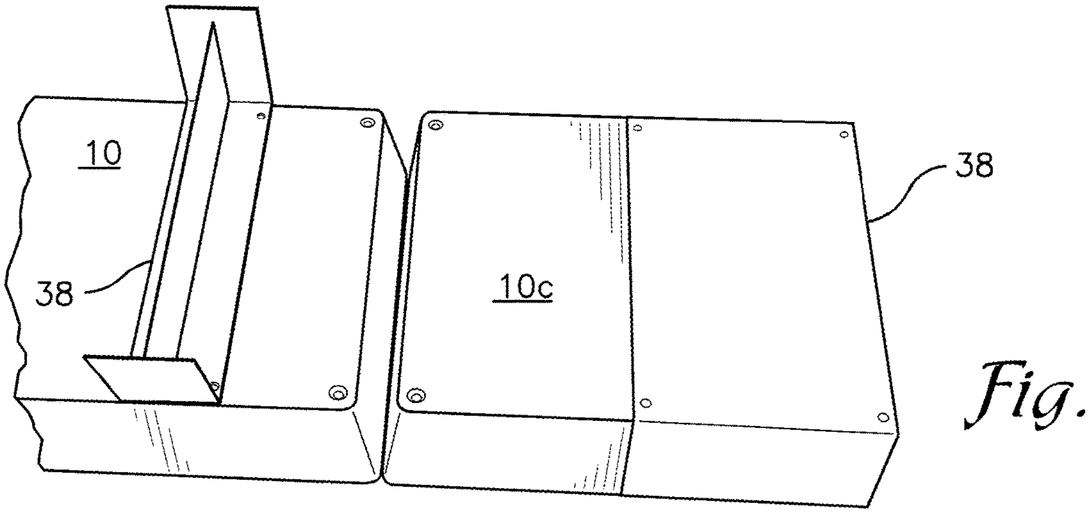
FIGS. 6-8 are illustrative images of waffle panel forms positioned end to end to provide a longer form and saddles disposed over a joint area therebetween depicted in accordance with an exemplary embodiment.
Figure 7:
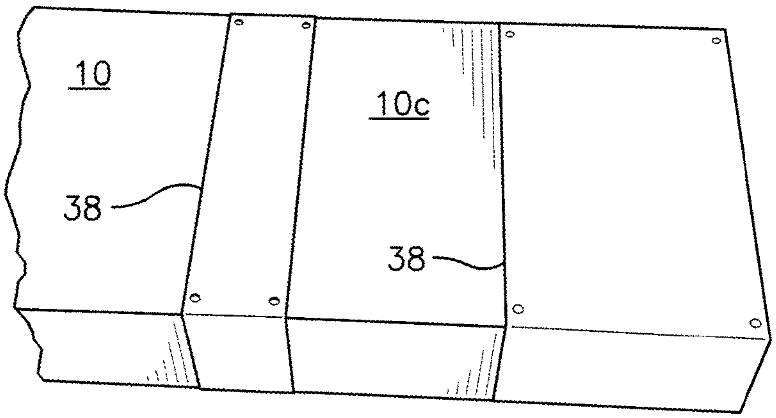
Figure 8:
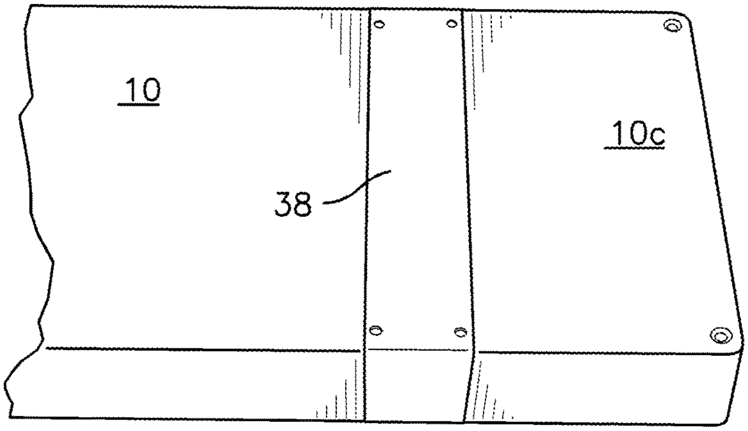
Figure 25:
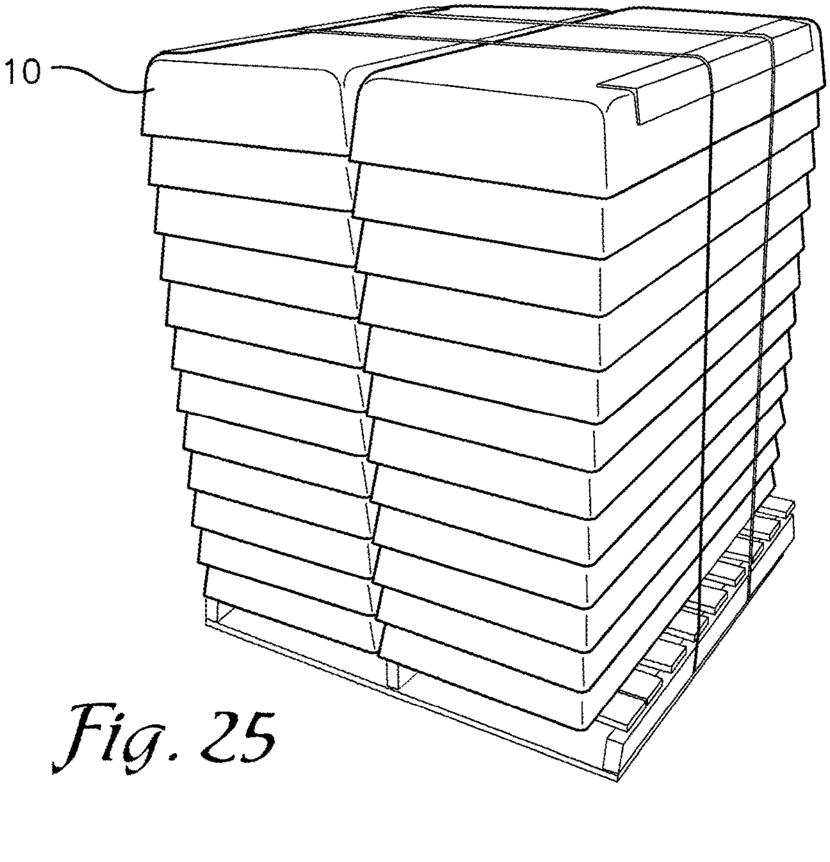
FIG. 25 is an illustrative image of a plurality of waffle panel forms nested together in a stacked orientation depicted in accordance with an exemplary embodiment.

A plurality of anchor stanchions 28 are provided at select locations along the perimeter wall 14. For example, the stanchions 28 may be provided at each corner of the top wall 12 and midway along the length of the top wall 12 among other available locations. The anchor stanchions 28 extend from the top wall 12 a distance into the interior of the form 10 and interior to the perimeter wall 14 but are recessed a distance into the body of the form 10 relative to a distal edge of the perimeter wall 14. The anchor stanchions 28 include a bore 30 extending through the length thereof and through the top wall 12 in which a fastener or anchor 32, such as a bolt or screw like that shown in FIG. 4 can be installed as described more fully below. In one embodiment, the anchor stanchions 28 are formed by or are integral with one or more of the ribs 20, 22. In another embodiment, a distal end 34 of the anchor stanchions 28 provides an abutment surface configured to abut and rest on the top wall 12 of another similarly configured form 10 when the forms 10 are nestably stacked on one another, as depicted in FIG. 25. The distal ends 34 of the stanchions 28 may be even with the grid surface formed by the longitudinal and transverse ribs 20, 22 such that the top wall 12 of the underlying stacked form 10 abuts both the distal ends 34 and the grid surface or the top wall 12 may only contact the grid surface without abutting the stanchions 28.

Figure 3:
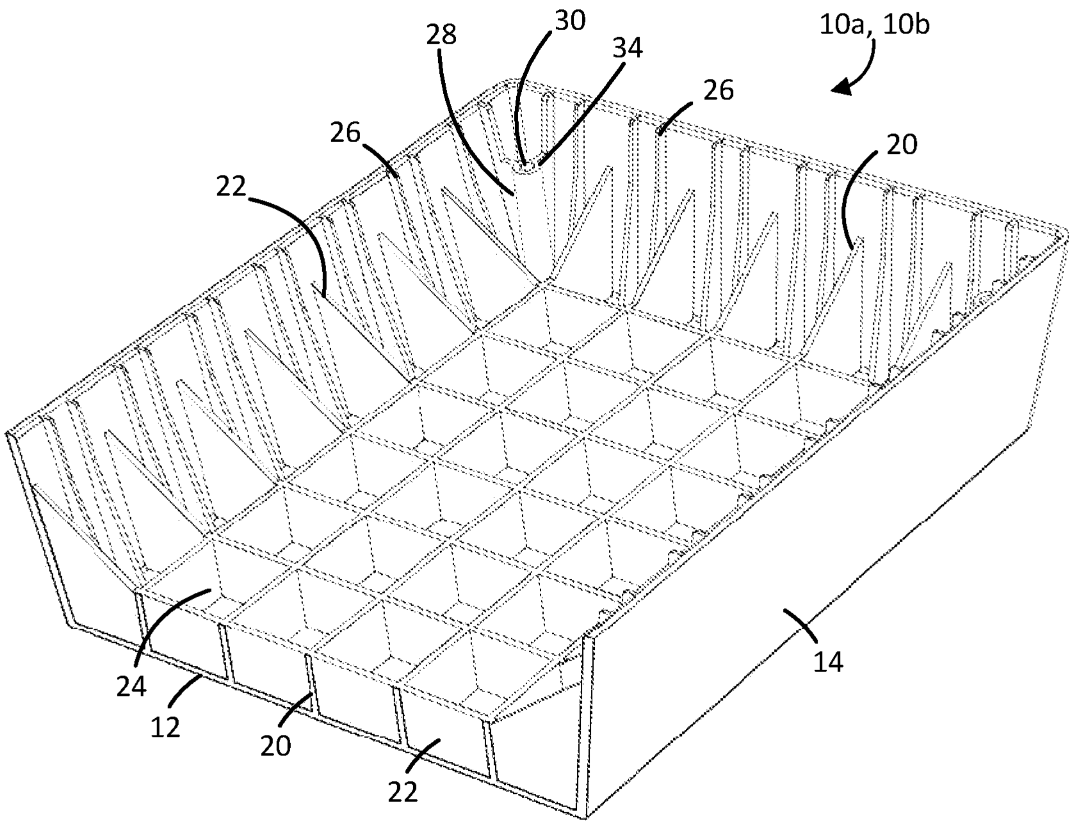
FIG. 3 is a perspective view of a waffle panel form that has been cut down to a desired length depicted in accordance with an exemplary embodiment.

As depicted in FIGS. 3 and 5-20, the waffle-cavity form 10 is configured to be easily adapted to a variety a sizes or dimensions. As shown in FIG. 3, the form 10 may be cut down to a length that is shorter than that of the original form 10. The form 10 is preferably formed from a plastic, composite, metal, or similar material that provides sufficient rigidity during casting operations but that can be cut using common tools, such as hand saws or power saws like band saws, table saws, jig saws, or the like.

The form 10 can be cut to any desired length. The cut location along the length of the form 10 is preferably located along an edge of the top wall 12 or within a perimeter of the top wall 12 such that the cut does not fall within a transverse portion of the perimeter wall 14. In one embodiment, it is preferable to cut the form 10 alongside one of the transverse ribs 22 such that the rib 22 provides an end face adjacent to the cut, as depicted in FIG. 3.

Figure 20:
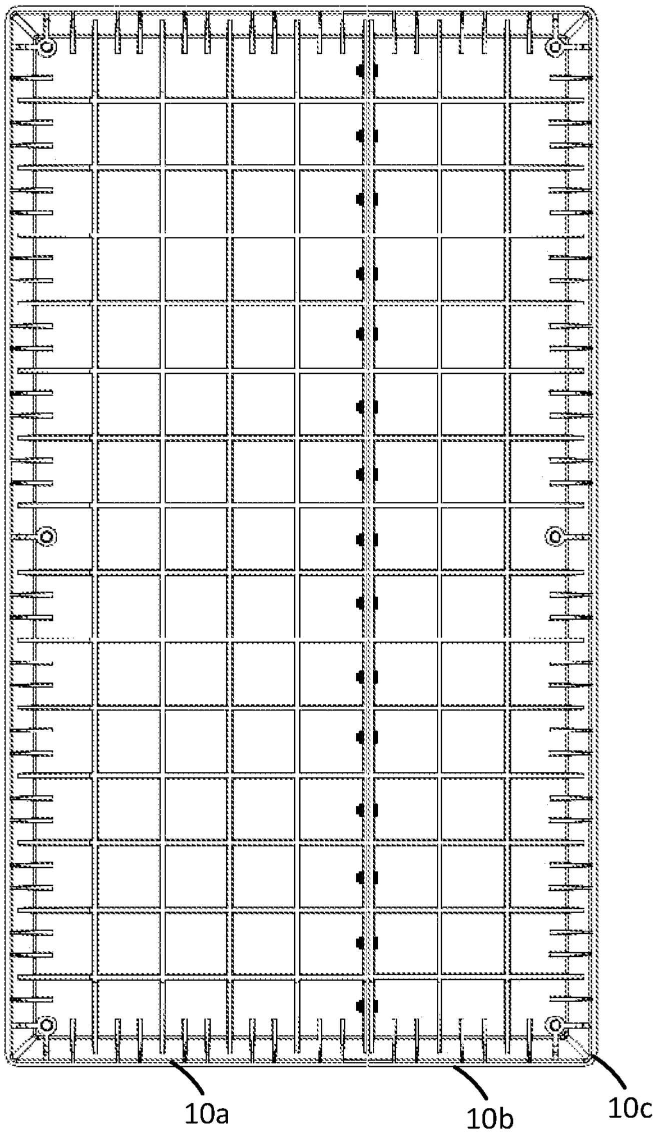
FIG. 20 is a bottom plan view of a widened waffle panel form produced from a pair of longitudinally cut-down waffle panel forms depicted in accordance with an exemplary embodiment.

Preferably, a pair of the forms 10 are cut down and their cut ends abutted to produce a form 10 with longer or shorter dimensions than that of the original form 10. For example, FIG. 16 depicts the uncut form 10 while FIG. 17 depicts a pair of cut forms **10*a*, 10*b* abutted to form a shorter combined form 10*c*, FIGS. 18 and 19 depict pairs of cut forms 10*a*, 10*b* abutted to form longer combined forms 10*c* of slightly different lengths. Although the forms 10 are described herein with respect to transverse cuts and abutting cut forms 10*a*, 10*b* to form a combined form 10*c* with varied lengths, it is understood that the forms 10 may be cut longitudinally and abutted to provide combined forms 10*c* having different transverse dimensions as depicted in FIG. 20 and/or cut and combined in both transverse and longitudinal directions to produce combined forms 10*c*** with varied length and width dimensions.

Figure 9:
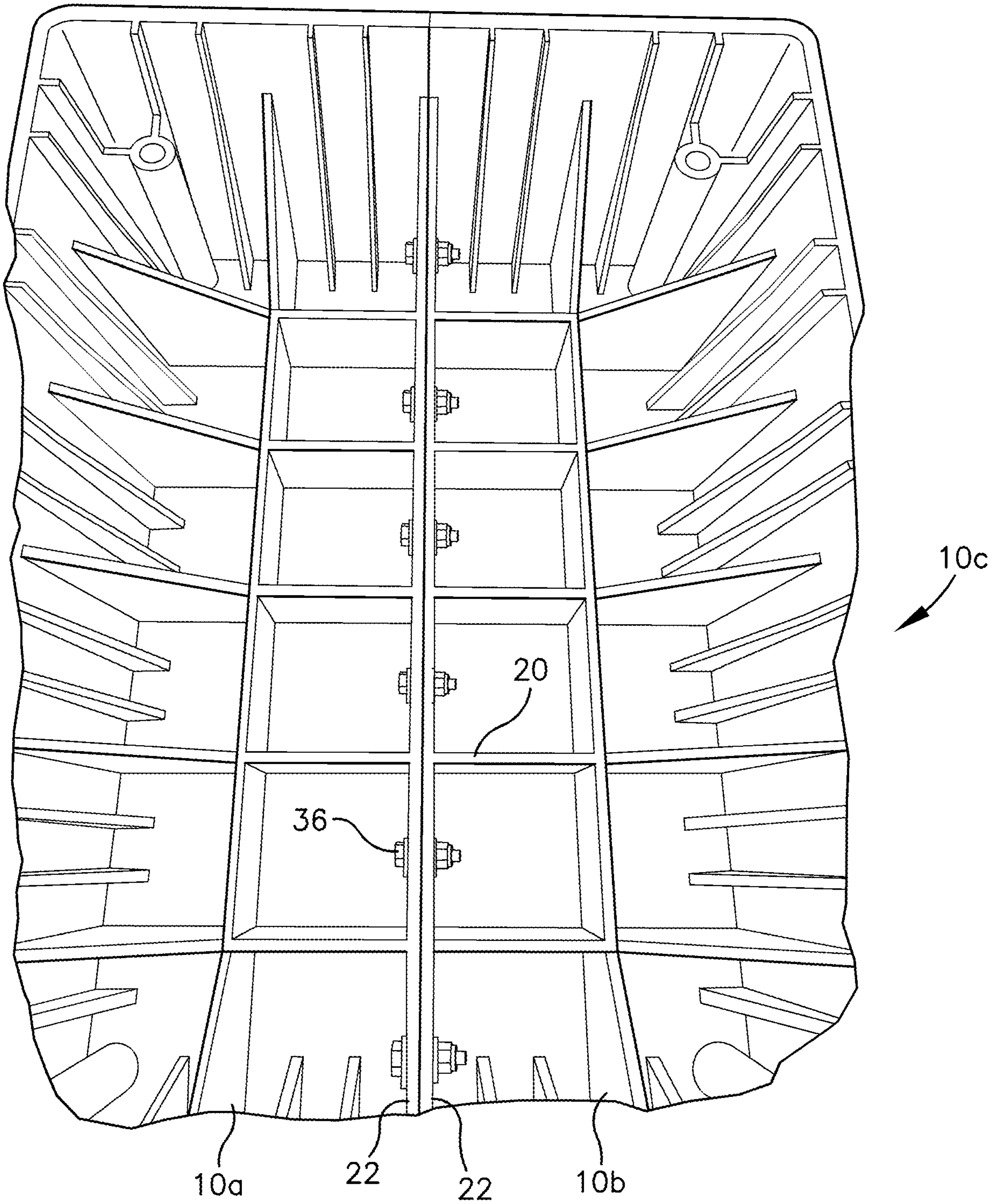
FIG. 9 is an illustrative image of a pair of cut-down waffle panel forms joined together to produce a form having a shorter longitudinal dimension than that of the waffle panel form of FIG. 1 depicted in accordance with an exemplary embodiment.
Figure 10:
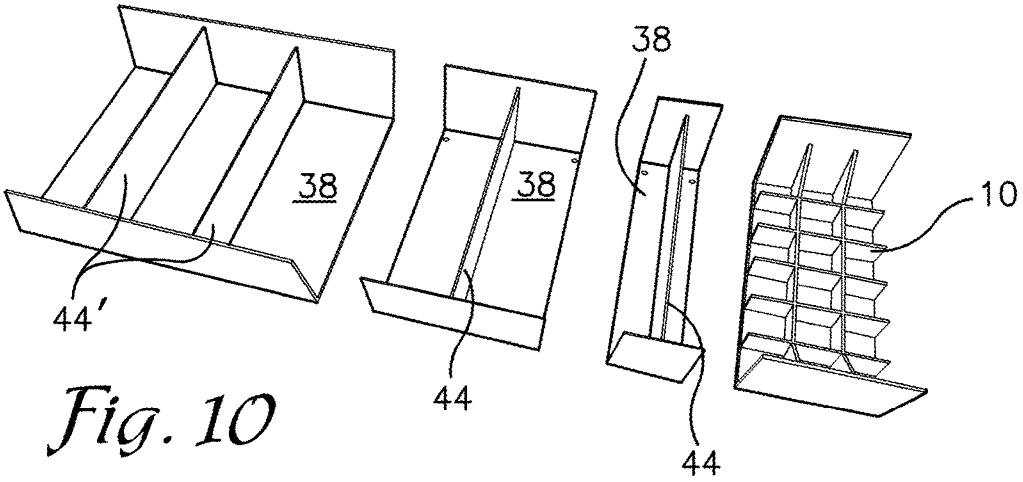
FIGS. 10-12 are illustrative images of saddles useable to enclose a joint between waffle panel forms depicted in accordance with an exemplary embodiment.
Figure 11:
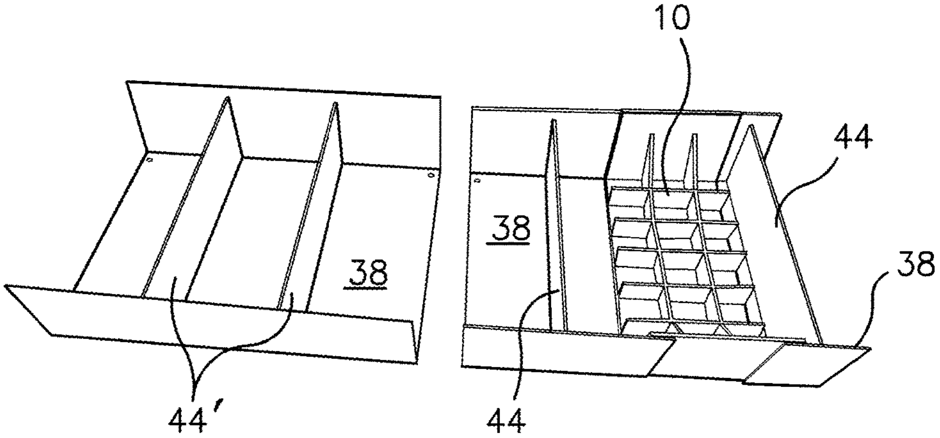
Figure 12:
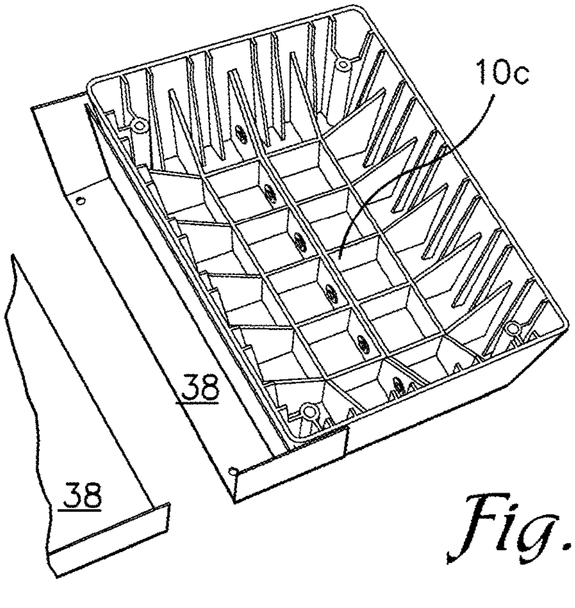
Figure 13:
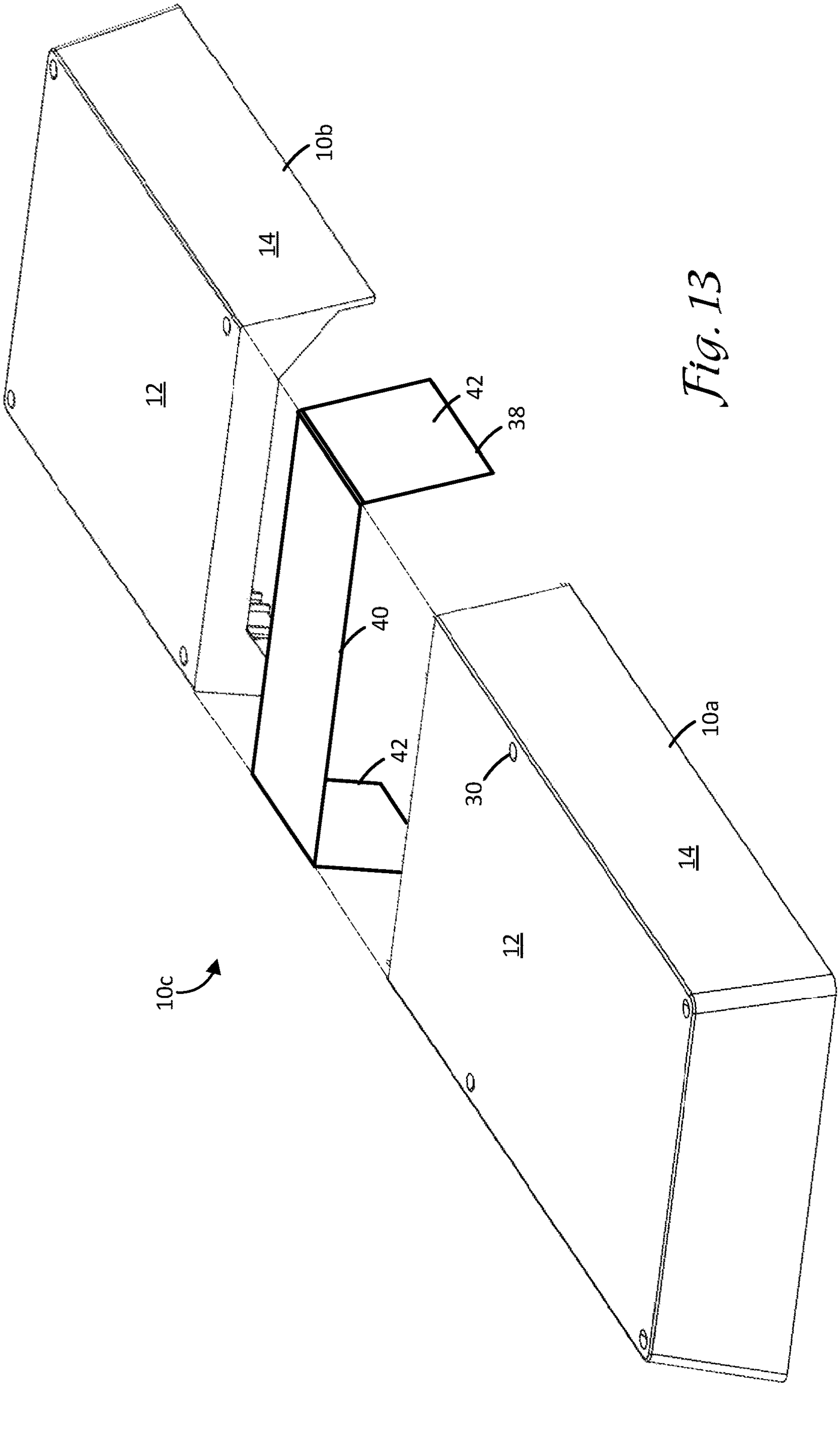
FIG. 13 is a perspective top view of a pair of cut-down waffle panel forms being disposed end-to-end with a saddle overlying a joint therebetween depicted in accordance with an exemplary embodiment.

The two cut down forms 10*a*, 10*b* are coupled together by installing fasteners 36, such as bolts, screws, rivets, clamps, or the like between their transverse ribs 22 that are adjacent to their cut ends, as depicted in FIG. 9. In one embodiment, holes may be drilled in each of the respective transverse ribs 22 adjacent to the cut ends to aid installation of the fasteners 36. In another embodiment, the two cut down forms 10*a*, 10*b* may be joined via welding or by application of an adhesive or tape applied to the joint therebetween.

In one embodiment, a saddle 38 is disposed on a top surface of a combined form 10 to overlie the joint between the abutted cut forms 10*a*, 10*b*, as depicted in FIGS. 6-8 and 13. The saddle 38 comprises a strip of material, such as for example metal sheet, having a length sufficient to extend the transverse width of the form 10 and a width sufficient to cover the joint between the cut forms 10*a*, 10*b* and to at least partially overlap top surfaces of the cut forms 10*a*, 10*b*. The saddle 38 is formed to mimic the contour of the form 10 to provide a top section 40 that lies on the top wall 12 of the form 10 and a pair of side panels 42 that follow the perimeter wall 14 on each transverse side of the form 10. The saddle 38 may be secured in place on the combined form 10*c* by installation of the fasteners 36 therethrough. Additional fasteners may also be employed and/or adhesives, glues, or the like can be employed between the saddle 38 and the form 10*c*.

As depicted in FIGS. 6, 10, 11, 12, 14, and 15 in another embodiment, the saddle 38 includes a flange 44 disposed on a bottom side of top section 40 to extend perpendicularly from the top section 40 and between the side panels 42. As such, when installed on the combined form 10*c*, the flange 44 is disposed between the cut forms 10*a*, 10*b* which are placed into abutment with opposing sides of the flange 44. In some embodiments, the saddle 38 is provided with two spaced apart flanges 44', ad depicted in FIGS. 10-11. The flanges 44' may thus aid to increase the length of a combined form 10*c* a desired amount by spacing apart the cut forms 10*a*, 10*b* which are each abutted against a respective one of the flanges 44' and enclosing the space therebetween.

Figure 14:
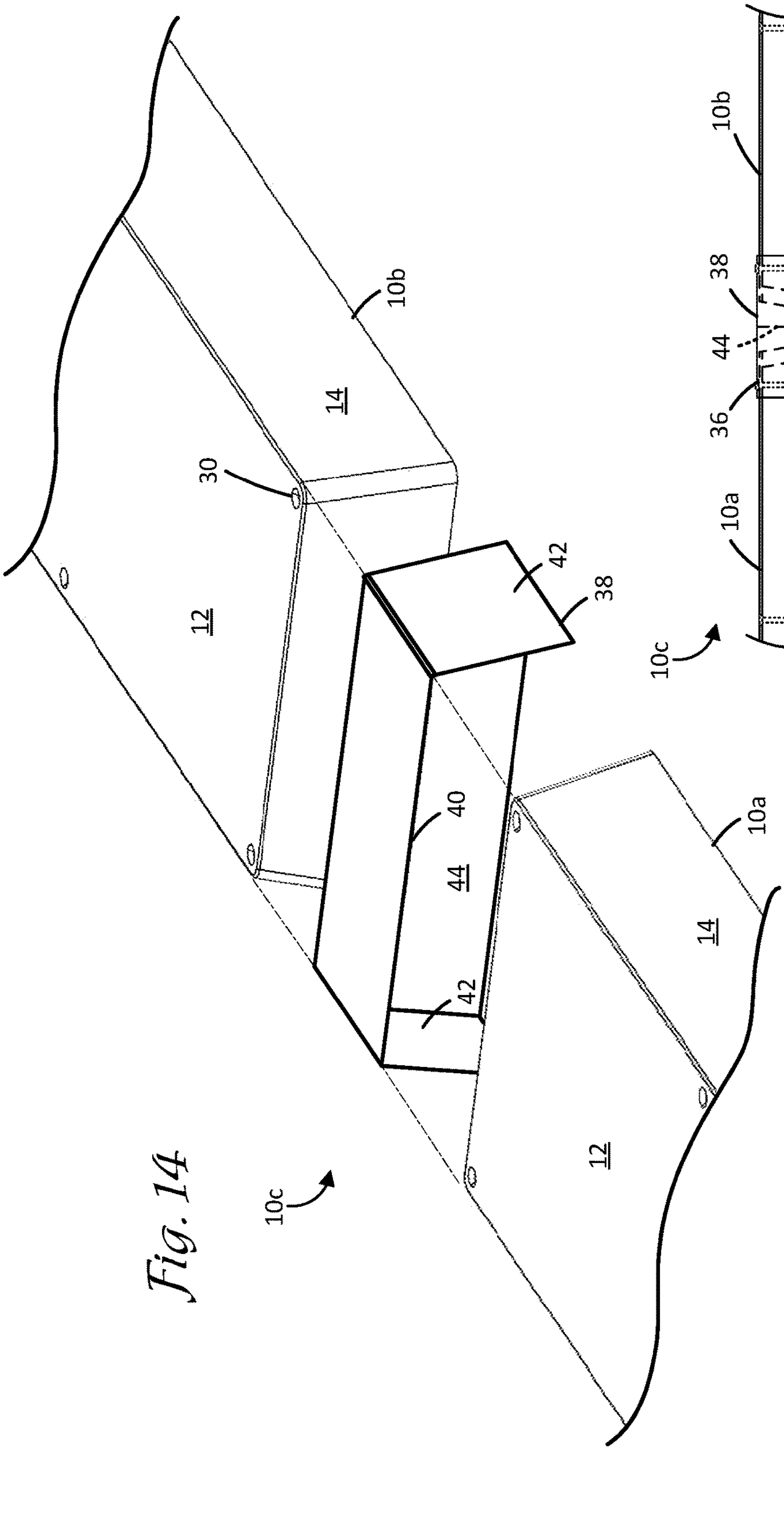
FIG. 14 is a perspective top view of a pair of uncut waffle panel forms being disposed end-to-end with a saddle overlying a space therebetween depicted in accordance with an exemplary embodiment.
Figure 15:
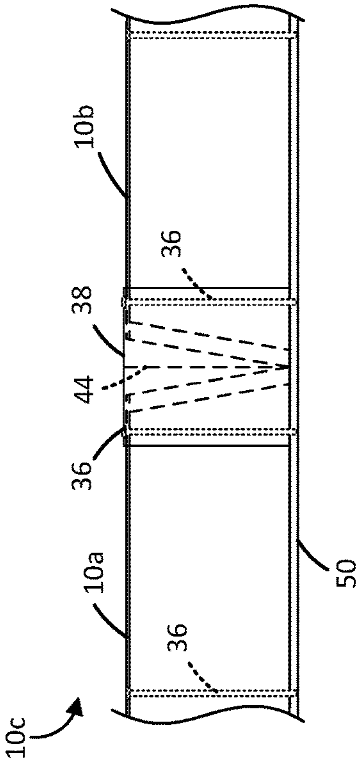
FIG. 15 is a partial side elevational view of a pair of uncut waffle panel forms joined end-to-end with a saddle overlying a space therebetween depicted in accordance with an exemplary embodiment.

The saddle 38 may also be employed to join two uncut forms 10 or to join a cut form 10*a*, 10*b* with an uncut form 10, as depicted in FIGS. 6-8 and 14-15. Combined forms 10*c* may also be joined with other cut or uncut forms 10, 10*a*, 10*b*. As shown in FIGS. 14 and 15, two uncut forms 10 may be placed end-to-end and abutting the flange 44 of the saddle 38 if present or abutting one another when no flange 44 is present to form a combined form 10*c*.

With reference now to FIGS. 21, 22, 23, 24, and 25, a method for constructing a waffle panel 16 using a plurality of the waffle-cavity forms 10 is described in accordance with an exemplary embodiment. The waffle panels 16 may take a variety of forms and may be employed in a number of different ways. For example, the panels 16 may be configured for use as loadbearing or non-loadbearing walls as well as floors, ceilings or roofs, among other uses. The panels 16 can be incorporated into single or multi-level structures that are positioned all or in part above or below ground level. Additionally, the panels 16 are described herein as being cast in a mold, demolded, and then moved into position in a structure, however the panels 16 may also be cast in place.

Initially, a plurality of the forms 10 are produced. Manufacturing cost and complexity for the forms 10 is minimized because only a single size form 10 need be produced. Further, storage, shipping, and inventory of the forms 10 is simplified because only the single size and shape of form need be handled and because the single size and shaped forms are easily nestably stacked for storage and shipping, as depicted in FIG. 25.

Figure 21:
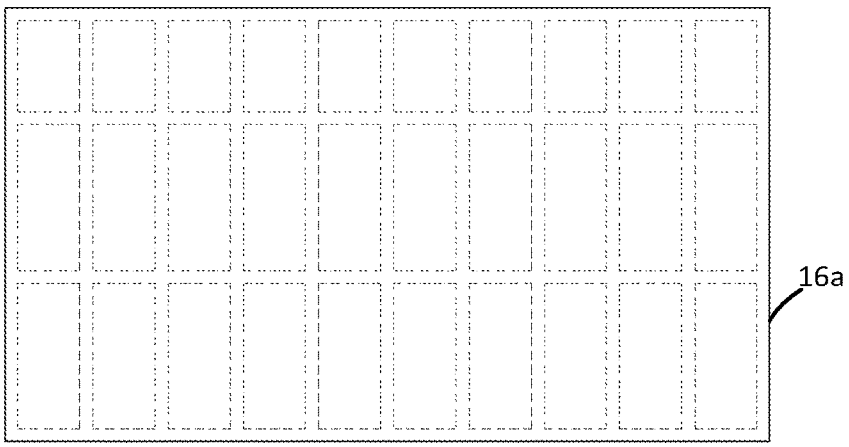
FIGS. 21-23 are elevational views of waffle panels formed using waffle panel forms in accordance with exemplary embodiments.
Figure 22:
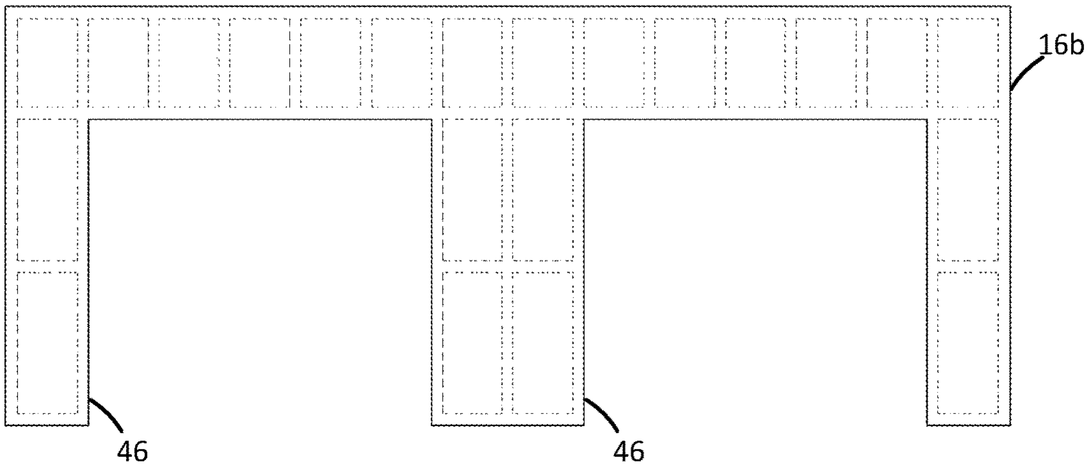
Figure 23:
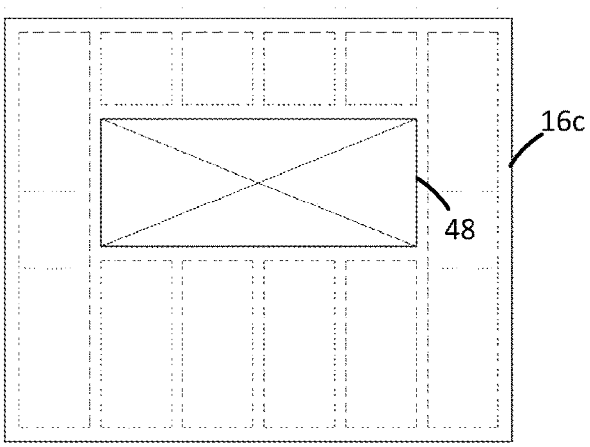
Figure 24:
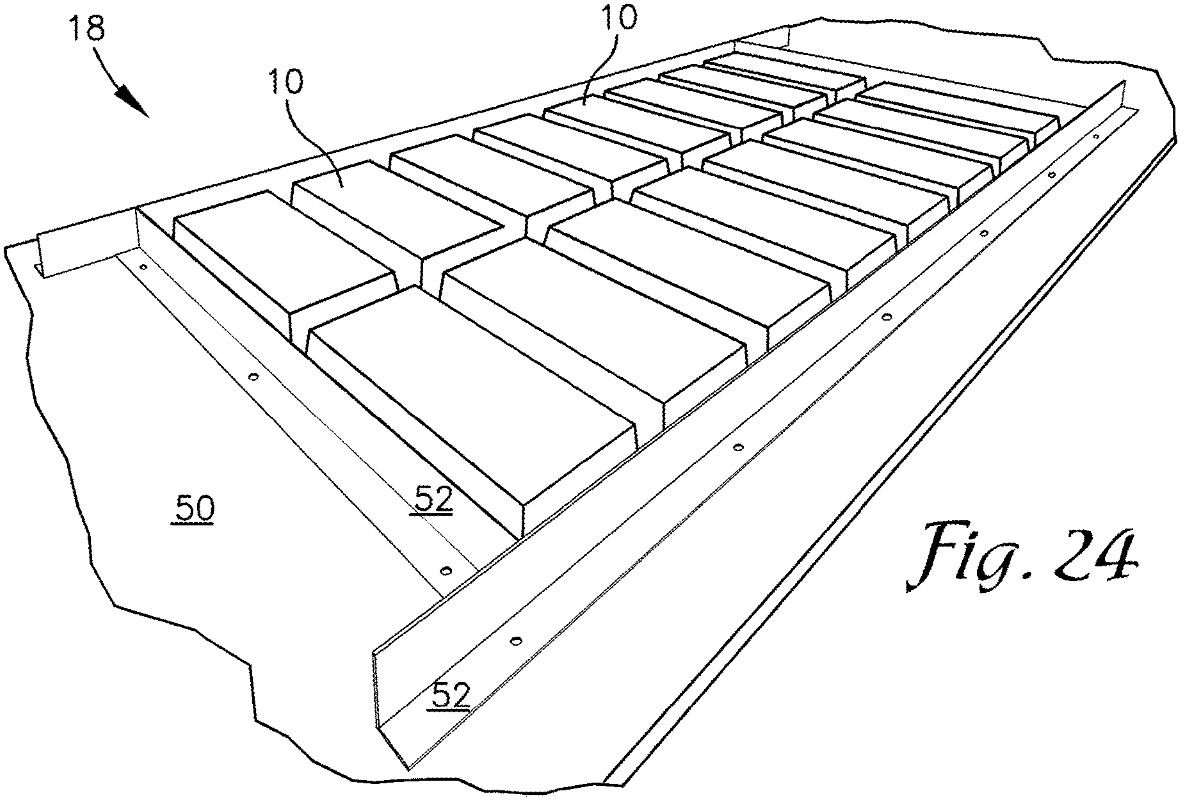
FIG. 24 is an illustrative image of a plurality of waffle panel forms disposed on and coupled to a form body in preparation for casting a waffle panel depicted in accordance with an exemplary embodiment.

Waffle panels 16 of a variety of layouts can be produced using the forms 10. For example, FIG. 21 depicts a full wall panel 16*a* without openings, FIG. 22 depicts a panel 16*b* with a pair of large door openings 46, and FIG. 23 depicts a panel 16*c* having a window cutout 48. To produce, for example, the full wall panel 16*a* of FIG. 21, a mold decking 50 having dimensions larger than that of the desired panel 16*a* is placed on a horizontal surface. Framing members 52 are positioned on the decking 50 to outline the desired perimeter of the panel 16*a* and coupled to the decking 50 such as by installing fasteners through the framing members 52 and into the decking 50. The framing members 52 have sufficient height above the decking 50 to accommodate a desired thickness of the waffle panel 16*a* to be cast.

Two rows of the forms 10 are laid out on the decking 50 inside the framing members 52. The forms 10 are spaced apart as desired and are coupled to the decking 50 by installing the anchors 32. The anchors 32 are disposed into the bores 30 through the anchor stanchions 28 and into the underlying decking 50.

As depicted in FIG. 21, a third row of forms 10 requires forms 10 of a reduced length. As such, a plurality of forms 10 are cut down as needed to produce combined forms 10*c* having the dimensions required for the third row. For example, the third row may require forms 10*c* having a length of two feet while the original forms 10 have a length of four feet. As such, a two-foot section may be cut from a central section of each of the original forms 10 and the remaining end portions abutted together to provide the needed two-foot long combined forms 10*c*. The forms 10 may alternatively be cut in any desired dimensions and combinations to provide the resulting combined forms 10*c* with the necessary dimensions.

The pairs of cut down forms 10*a*, 10*b* are coupled together by forming holes in their respective transverse flanges 22 nearest to their cut faces. The respective holes in each of the cut forms 10*a*, 10*b* align longitudinally such that the fasteners 36 are installable therebetween. The fasteners 36 are installed in the holes and the combined forms 10 are disposed on the mold decking 50 in the desired arrangement. The anchors 32 are installed in the combined forms 10*c* to affix the combined forms 10*c* to the decking 50.

In some embodiments, saddles 38 may be employed on the combined forms 10*c*. The saddles 38 may be disposed on each of the combined forms 10*c* to cover the seam or joint therebetween or to enclose a gap between the cut forms 10*a*, 10*b* that form the combined form 10*c* when those cut forms 10*a*, 10*b* are retained in a spaced apart relation. The saddles 38 may be affixed to the combined form 10*c* by installation of the anchors 32 therethrough, installation of fasteners 36 between the saddles 38 and the combined form 10*c*, or by use of glues, adhesives, or the like.

Following securement of the framing members 52 and the forms 10, 10*c* to the decking 50 to form the mold 18 any desired mold preparation steps may be completed. For example, the mold decking 50, framing members 52, and forms 10, 10*c* may be sprayed with a mold release agent and reinforcement members such as rebar can be disposed within the mold 12 among a variety of other known preparations. A concrete or other casting material is poured into the mold 18 to fill the mold 18 to a desired depth. In some embodiments, the concrete is filled to a depth between about two and about four inches over the top walls 12 of the forms 10, 10*c* however any desired fill depth may be used for a particular application. In some embodiments, the fill depth is less than the height of the forms 10, 10*c* to provide apertures through the waffle panel 16 rather than enclosed waffle cavities 56.

The filled mold 18 may be covered and/or insulated to aid curing of the concrete/casting material as known in the art. The pockets 24 formed by the longitudinal and transverse ribs 20, 22 may aid to provide insulation within the forms 10, 10*c* to further aid curing of the concrete/casting material.

Upon sufficient completion of curing of the concrete/casting material, such as overnight, the waffle panel 16 can be removed from the mold 18. The waffle panel 16 may be placed in another location to allow additional time for curing or the panel 16 may be installed directly into a structure. The mold 18 may then be cleaned and/or prepped for subsequent casting without the need to replace the forms 10, 10*c*. When subsequent castings require a different arrangement of the forms 10, the forms 10 can be easily removed from the mold decking 50 by removal of the anchors 32. The forms 10, 10*c* can then be rearranged and/or replaced with other forms 10 or combined forms 10*c* of different dimensions as needed.

Many different arrangements of the various components depicted, as well as components not shown, are possible without departing from the scope of the description provided herein. Exemplary embodiments have been described with the intent to be illustrative rather than restrictive. Alternative embodiments will become apparent to readers of this disclosure after and because of reading it. Alternative means of implementing the aforementioned can be completed without departing from the scope of exemplary embodiments described herein. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of exemplary embodiments described herein.

What is claimed is:

1. A reusable adaptable universal waffle-cavity molding form, comprising:

a first form and a second form positioned adjacent each other in abutted relationship, wherein the first form and the second form each comprise a planar top wall having a length and a width, a perimeter wall extending downwardly and outwardly from three sides of the top wall such that the top wall and the perimeter wall form a cavity for receiving material to be molded, and a plurality of longitudinal ribs and a plurality of transverse ribs extending along the length and the width of the form, respectively, the ribs attached to the top wall and the perimeter wall within the cavity, wherein one of the plurality of transverse ribs extends along a fourth side of the top wall and comprises a plurality of holes formed therethrough, and wherein the top wall, perimeter wall, and ribs are integrally formed from a flexible, resilient material such that the form can be removed from molded material and reused;

wherein the transverse rib having holes formed therethrough of the first form is positioned adjacent the transverse rib having holes formed therethrough of the second form with fasteners inserted through the holes to attach the first form to the second form.

2. The reusable adaptable universal waffle-cavity molding form of claim 1, further comprising a plurality of anchor stanchions positioned within the cavity of each of the first and second forms at a perimeter of the respective form.

3. The reusable adaptable universal waffle-cavity molding form of claim 1, wherein the length of the first form is different that the length of the second form.

4. The reusable adaptable universal waffle-cavity molding form of claim 1, wherein the plurality of longitudinal ribs and the plurality of transverse ribs of each of the first and second forms form a grid of pockets along the top wall within the cavity of the respective form.

5. The reusable adaptable universal waffle-cavity molding form of claim 1, wherein the planar top and perimeter wall of each of the first and second forms define a generally trapezoidal prism shaped form.

6. The reusable adaptable universal waffle-cavity molding form of claim 1, further comprising a plurality of stiffening ridges positioned along the perimeter wall of each of the first and second forms.

7. The reusable adaptable universal waffle-cavity molding form of claim 1, further comprising a third form having a planar top wall and a perimeter wall extending downwardly and outwardly from two opposite sides of the top wall, wherein the third form is positioned between and attached to the first and second forms.

8. A method for constructing waffle panels from a moldable material, comprising:

providing a reusable adaptable universal waffle-cavity molding form comprising first and second forms in accordance with claim 1;

placing the first form and the second form adjacent each other in abutted relationship on a horizontal surface;

attaching the first form to the second form to form a waffle-cavity molding form of a desired size;

pouring a casting material into the waffle-cavity molding form and filling the form to a desired depth;

allowing the casting material to cure to form a waffled panel; and removing the formed waffle panel from the waffle cavity molding form.

9. The method of claim 8, further comprising:

reusing the removed waffle-cavity molding form to construct an additional waffle panel.

10. The method of claim 8, further comprising:

spraying a release agent to the cavity of the waffle-cavity molding form.

11. The method of claim 8, further comprising:

attaching the waffle-cavity molding form to the horizontal surface.

12. The method of claim 11, wherein attaching the waffle-cavity molding form to the horizontal surface comprises inserting one or more fasteners through corresponding stanchions in the mold.

13. A method for constructing waffle panels of a desired length and width, comprising:

providing a first form and a second form in accordance with claim 1;

abutting the edges of the first form and the second form to achieve a desired length and width;

pouring a casting material into the abutted forms and filling to a desired depth;

allowing the casting material to cure to form a waffled panel; and removing the formed waffle panel from the abutted forms.

14. The method of claim 13, further comprising:

reusing the removed abutted forms to construct an additional waffle panel.

15. The method of claim 13, wherein the abutted forms are joined using a saddle.

16. The method of claim 13, further comprising:

attaching the abutted forms to a horizontal surface.

17. The method of claim 16, wherein attaching the abutted forms to the horizontal surface comprises inserting one or more fasteners through corresponding stanchions in the abutted forms.

* * * * *